(12) United States Patent
Lee et al.

(10) Patent No.: US 8,441,585 B2
(45) Date of Patent: May 14, 2013

(54) STEREOSCOPIC IMAGE DISPLAY DEVICE (75) Inventors: Seungchul Lee, Gyeonggi-do (KR); Woonam Jeong, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 393 days.

(21) Appl. No.: 12/962,713

(22) Filed: Dec. 8, 2010

(65) Prior Publication Data
US 2011/0228182 A1 Sep. 22, 2011

(30) Foreign Application Priority Data

Mar. 22, 2010 (KR) .................. 10-2010-0025405

(51) Int. Cl.
*G02F 1/1335* (2006.01)
(52) U.S. Cl.
USPC .................. 349/15; 345/8; 348/51
(58) Field of Classification Search .......... 349/15; 345/8; 348/51
See application file for complete search history.

(56) References Cited

U.S. PATENT DOCUMENTS

2007/0109252 A1* 5/2007 Shin et al. ............. 345/102
2011/0157332 A1* 6/2011 Kim et al. ............. 348/56

* cited by examiner

*Primary Examiner* — Lucy Chien
(74) *Attorney, Agent, or Firm* — Morgan, Lewis & Bockius LLP

(57) ABSTRACT

A stereoscopic image display device comprises: a liquid crystal panel for time-divisionally displaying left-eye image frame data and right-eye image frame data; a backlight unit being divided into a plurality of blocks, and sequentially scanned for each block to provide light to the liquid crystal panel; and shutter glasses comprising a left-eye filter transmitting only the light of the left-eye image and a right-eye filter transmitting only the light of the right-eye image, wherein the time period of sequentially lighting the first to the last blocks of the backlight unit is shorter than the period of addressing the left-eye image frame data or the right-eye image frame data from the first line to the last line of the liquid crystal panel.

15 Claims, 7 Drawing Sheets

STEREOSCOPIC IMAGE DISPLAY DEVICE

This application claims the benefit of Korea Patent Application No. 10-2010-0025405 filed on Mar. 22, 2010, which is incorporated herein by reference for all purposes as if fully set forth herein.

BACKGROUND

1. Field

This invention relates to a stereoscopic image display device.

2. Related Art

A stereoscopic image display may be classified into a stereoscopic technique and an autostereoscopic technique.

The stereoscopic technique is implemented using parallax images of left and right eyes having the most reliable three dimensional effects. The stereoscopic technique is classified into a glasses method and a non-glasses method, both of which are commercialized. The glasses method displays left and right parallax images on a direct-view display or projector in a time-divisional manner by changing polarization direction of the left and right parallax images, and implements a stereoscopic image using polarization glasses or liquid-crystal shutter glasses. The non-glasses method is a method in which an optical plate for separating the optical axes of left and right parallax images, such as a parallax barrier, is installed in front or rear of a liquid crystal panel.

A conventional stereoscopic image display device using a liquid crystal panel and liquid-crystal shutter glasses requires a certain amount of standby time until an image can be normally displayed due to response time of liquid crystals even if an image signal is applied to each pixel. Due to the response time of liquid crystals, a scanning method in which the display device is driven at a frame frequency above 120 Hz, for example, at 172 Hz, 240 Hz, etc. is used in the conventional stereoscopic image and a backlight unit is divided into blocks which sequentially irradiate light to the liquid crystal panel.

The stereoscopic image display device, however, generates much heat in a driving circuit and is vulnerable to electromagnetic interference at a frame frequency above 120 Hz.

SUMMARY

An aspect of this invention is to provide a stereoscopic image display device, which can display a smooth stereoscopic image by preventing mixing of left-and right-eye images at frame frequency of 120 Hz at which flicker perception can be eliminated.

According to one exemplary embodiment of the present invention, there is provided a stereoscopic image display device, comprising: a liquid crystal panel having a plurality of gate lines and a plurality of data lines for time-divisionally displaying left-eye image frame data and right-eye image frame data; a backlight unit being divided into a plurality of blocks, and sequentially scanned for each block to provide light to the liquid crystal panel; and shutter glasses comprising a left-eye filter transmitting only the light of the left-eye image and a right-eye filter transmitting only the light of the right-eye image, wherein the time period of sequentially scanning the first to the last blocks of the backlight unit is shorter than the period of addressing the left-eye image frame data or the right-eye image frame data from the first line to the last line of the liquid crystal panel.

The lighting period of the backlight unit for displaying the left-eye image partially overlaps with the addressing period of the left-eye image frame data, and the lighting period of the backlight unit for displaying the right-eye image partially overlaps with the addressing period of the right-eye image frame data.

In the backlight unit, the lighting periods of adjacent blocks partially overlap each other.

The lighting period of each block of the backlight unit is equal; and an overlap width of the lighting periods of the adjacent blocks becomes wider from the upper blocks to the lower blocks.

The difference between the start points of lighting of the adjacent blocks decreases from the upper blocks to the lower blocks.

The lighting period of each block of the backlight unit is equal; and the overlap width of the lighting periods of the adjacent blocks becomes further wider at the two uppermost blocks and the two lowermost blocks, rather than at the remaining blocks.

The difference between the start points of lighting of the uppermost adjacent blocks and the difference between the start points of lighting of the lowermost adjacent blocks are less than the difference between the start points of lighting of the remaining adjacent blocks.

The start point of lighting of the first block is delayed a predetermined time, and the start point of lighting of the last block is advanced a predetermined time.

The lefteye image frame data and the right-eye image frame data are time-divisionally displayed at 120 Hz; and the lighting period $T_{BLU}$ of each block satisfies the following equation:

$$T_{LC}+T_{BLU} \leq T_{frame}$$

wherein $T_{frame}$ indicates the addressing period required for addressing the left-eye image frame data or the right-eye image frame data to the liquid crystal panel, and n indicates the number of blocks of the backlight unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Hereinafter, an implementation of this document will be described in detail with reference to the attached drawings.

Figure 1:
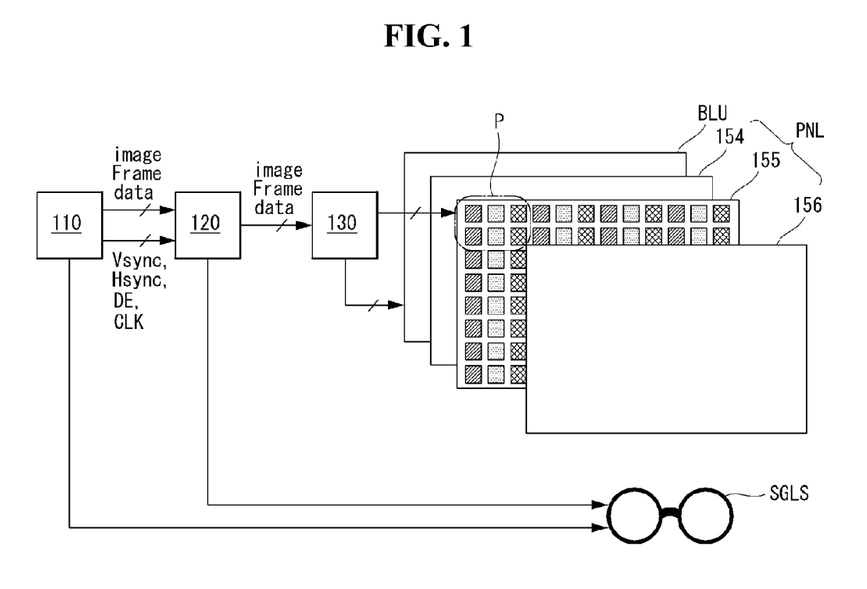
FIG. 1 is a schematic block diagram of a stereoscopic image display device according to one exemplary embodiment of the present invention.
Figure 2:
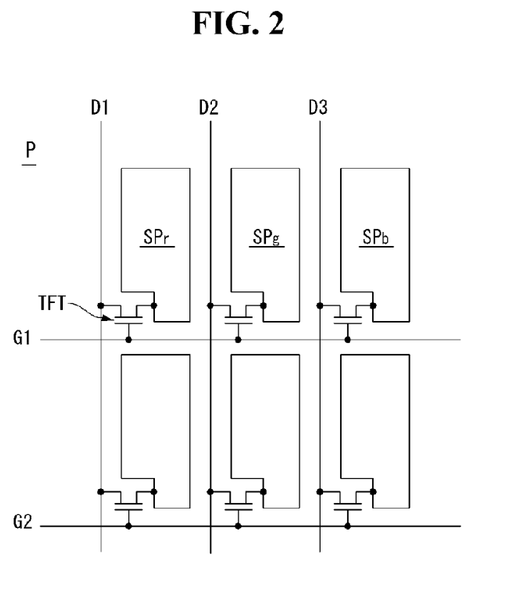
FIG. 2 is a configuration diagram of subpixels of the liquid crystal panel shown in FIG. 1.
Figure 3:
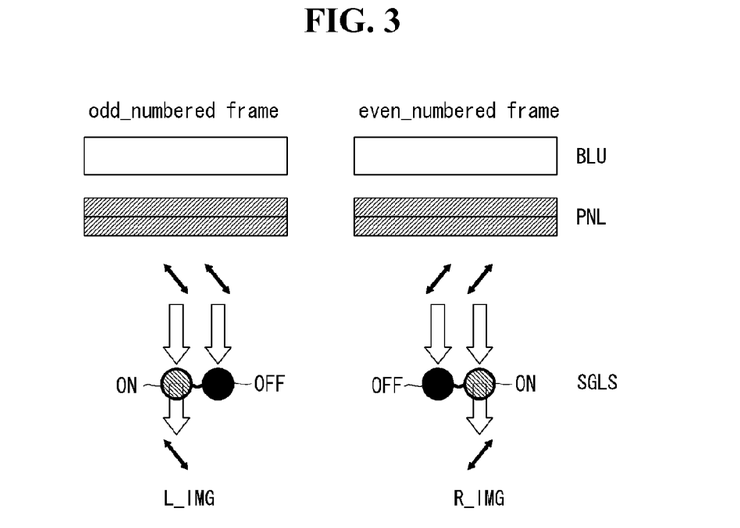
FIG. 3 is a view for explaining the concept of driving the stereoscopic image display device.

FIG. 1 is a schematic block diagram of a stereoscopic image display device according to one exemplary embodiment of the present invention, FIG. 2 is a configuration diagram of subpixels of the liquid crystal panel shown in FIG. 1, and FIG. 3 is a view for explaining the concept of driving the stereoscopic image display device.

AS shown in FIG. 1, a stereoscopic image display device comprises a image supply unit 110, a control unit 120, a driving unit 130, a backlight unit BLU, a liquid crystal panel PNL, and shutter glasses SGLS.

The liquid crystal panel PNL receives gate driving signals and data driving signals from the driving unit 130, and displays a two-dimensional image or a three-dimensional image in response to the signals. The liquid crystal panel PNL comprises a TFT substrate where thin film transistors (hereinafter, referred to as "TFTs") and capacitors are formed and a color filter substrate where color filters and black matrices are formed. A liquid crystal layer is formed between the TFT substrate and the color filter substrate. As shown in FIG. 2, data lines D1 to D3 and gate lines G1 and G2 are formed on the TFT substrate to cross each other, and subpixels SPr, SPg, and SPb defined by the data lines D1 to D3 and the gate lines G1 and G2 are formed in a matrix thereon. In response to the gate driving signals supplied through the gate lines G1 and G2, the TFTs formed at the crossing of the data lines D1 to D3 and the gate lines G1 and G2 are switched on to supply the pixel elextrodes of liquid crystal cells with the data driving signals supplied through the data lines D1 to D3. A common voltage is supplied to a common electrode facing the pixel electrodes. The liquid crystal layer is driven by a difference between voltages supplied to the pixel electrodes and the common electrode. The common electrode is formed on the color filter substrate in a vertical electric field driving manner, such as a twisted nematic (TN) mode and a vertical alignment (VA) mode. The pixel electrodes are formed on the TFT substrate in a horizontal electric field driving manner, such as an in-plane switching (IPS) mode and a fringe field switching (FFS) mode. The liquid crystal panel PNL may be implemented in any liquid crystal mode as well as the TN, VA, IPS, and FES modes. Polarizing plates 154 and 156 are respectively attached to the color filter substrate and the TFT substrate of the liquid crystal panel PNL. The thus-constructed liquid crystal panel PNL can display an image by using light provided from the backlight unit BLU.

The backlight unit BLU is driven by sequentially scanning each block under control of the image supply unit 110 or the control unit 120 to provide light to the liquid crystal panel PNL. The backlight unit BLU comprises a light source for emitting light, a light guide plate for guiding the light emitted from the light source in the direction of the liquid crystal panel PNL, and an optical member for diffusing and converging the light emitted from the light guide plate. The backlight unit BLU is configured as an edge type, a dual type, a quad type, a direct type, etc. The edge type is formed by arranging the light source on one side of the liquid crystal panel PNL, the dual type is formed by arranging the light source so as to face both sides of the liquid crystal panel PNL, the quad type is formed by arranging the light source in four directions of the liquid crystal panel PNL, and the direct type is formed by arranging the light source under the liquid crystal panel PNL.

The image supply unit 110 generates 2D image frame data in a 2D mode and generates 3D image frame data in a 3D mode. The image supply unit 110 supplies timing signals, such as a vertical sync signal Vsync, a horizontal sync signal Hsync, a data enable signal DE, and a main clock CLK, and image fame data to the control unit 120. Specifically, the image supply unit 110 switches between the 2D mode and the 3D mode according to a user's selection input through a user interface, and generates an image frame data corresponding to the user's selection input and supplies it to the control unit 120. The user interface includes user input means, such as an on-screen display (OSD), a remote controller, a keyboard, and a mouse. Also, the image supply unit 110, when set to the 3D mode, generates a glasses driving signal, and supplies it to the shutter glasses SGLS in a wired or wireless data transmission scheme. The following description will be given about an example in which the image supply unit 110 operates in a 3D mode and supplies 3D image frame data to the control unit 120.

The control unit 120 receives 3D image frame data comprising left-eye image frame data and right-eye image frame data from the image supply unit 110. The control unit 120 alternately supplies the left-eye image frame data and the right-eye image frame data to the driving unit 130 at a frame frequency of 120 Hz.

The driving unit 130 comprises a data driver connected to the data lines D1 to D3 to supply the data driving signals and a gate driver connected to the gate lines G1 and G2 to supply the gate driving signals. The driving unit 130 converts digital left-eye and right-eye image frame data into positive and negative analog left-eye and right-eye image frame data under the control of the control unit 120 to supply the data to the data lines D1 to D3 as the data driving signals. Also, the driving unit 130 sequentially supplies the gate driving signals to the gate lines G1 and G2 under the control of the control unit 120.

The shutter glasses SGLS have a left-eye shutter and a right-eye shutter that are respectively electrically controlled. The left-eye shutter transmits only the light of a left-eye image displaying on the liquid crystal panel PNL, and the right-eye shutter transmits only the light of a right-eye image displaying on the liquid crystal panel PNL. The shutter glasses SGLS receive a glasses driving signal from the image supply unit 110 or the control unit 120. In response to the glasses driving signal, the shutter glasses SGLS open the left-eye shutter when the left-eye image is displayed on the liquid crystal panel PNL, and open the right-eye shutter when the right-eye image is displayed on the liquid crystal panel PNL.

With the above-described configuration, when light is emitted from the backlight unit BLU, the left-eye image and the right-eye image are displayed on the liquid crystal panel PNL, and a user can view a 3D stereoscopic image through the shutter glasses SGLS. This will be described in more detail below.

As shown in FIG. 3, when the image supply unit 110, the control unit 120, and the driving unit 130 operate, light is emitted from the backlight unit BLU and a left-eye image LEFT is displayed on the liquid crystal panel PNL during for example the odd-numbered frames. At this point, the left-eye shutter of the shutter glasses SGLS is turned ON, and the right-eye shutter of the shutter glasses SGLS is turned OFF. On the other hand, when the image supply unit 110, the control unit 120, and the driving unit 130 operates, light is emitted from the backlight unit BLU, and a right-eye image RIGHT is displayed on the liquid crystal panel PNL during for example the even-numbered frames. At this point, the right-eye shutter of the shutter glasses SGLS is turned ON, and the left-eye shutter of the shutter glasses SGLS is turned OFF. Of course, a left-eye image L_IMG can be displayed on the liquid crystal panel PNL during the even-numbered frames and a right-eye image R_IMG can be displayed on the liquid crystal panel PNL during the odd-numbered frames.

Hereinafter, the details of driving a stereoscopic image display device according to exemplary embodiments of the present invention will be described with reference to FIGS. 4 to 11.

<First Exemplary Embodiment>

FIGS. 4 to 7 are views for explaining the details of driving a stereoscopic image display device according to a first exemplary embodiment of the present invention.

Figure 4:
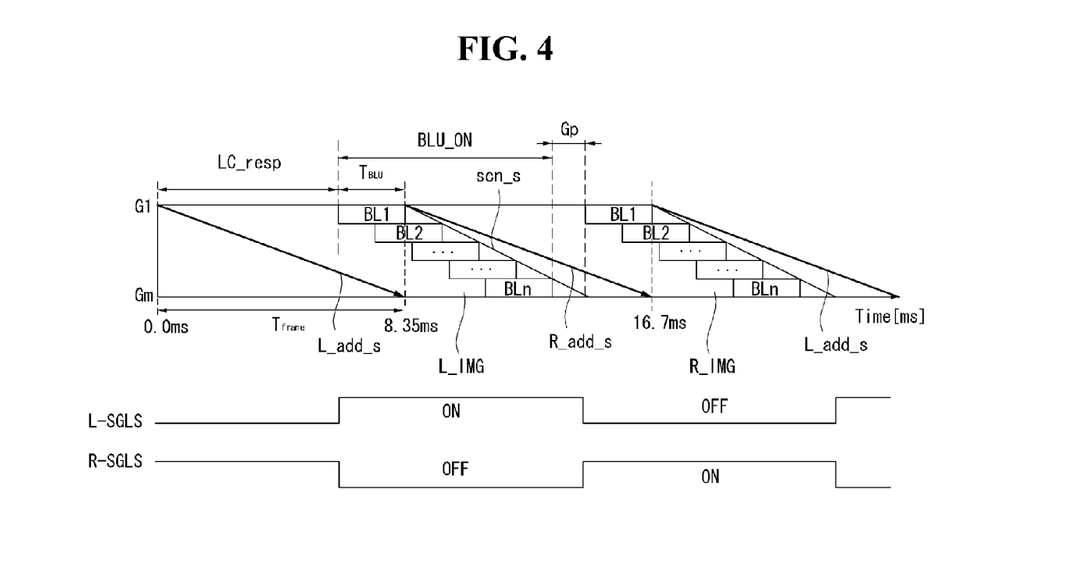
FIGS. 4 to 7 are views for explaining the details of driving a stereoscopic image display device according to a first exemplary embodiment of the present invention.

Referring to FIG. 4, the liquid crystal panel PNL included in the stereoscopic image display device alternately displays a left-eye image L_IMG and right-eye image R_IMG of each frame in either a left to right or right to left manner. The backlight unit BLU is scanned for each block and sequentially provides light to the liquid crystal panel PNL. The time point when the shutter glasses SGLS are turned on is equal to or earlier than the time point when the first block BL1 included in the backlight unit BLU is scanned. This will be described in more detail below.

Figure 5:
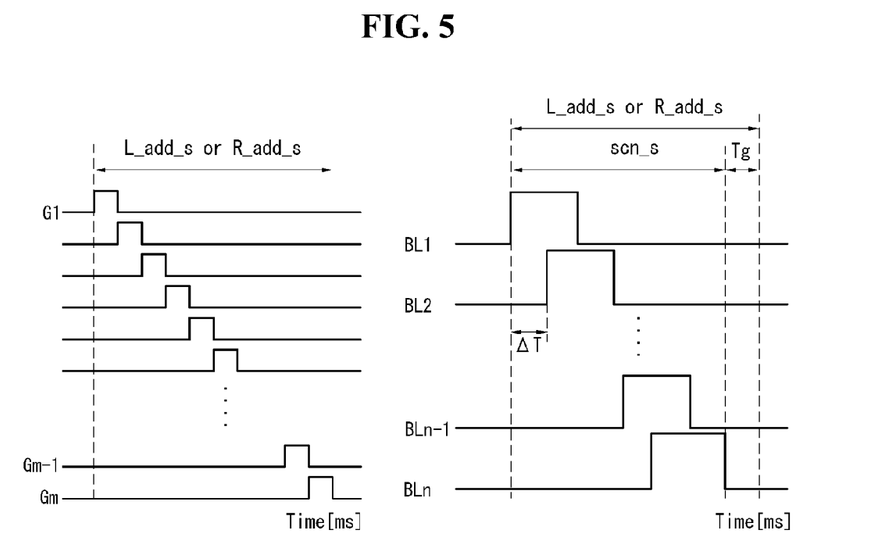
Figure 6:
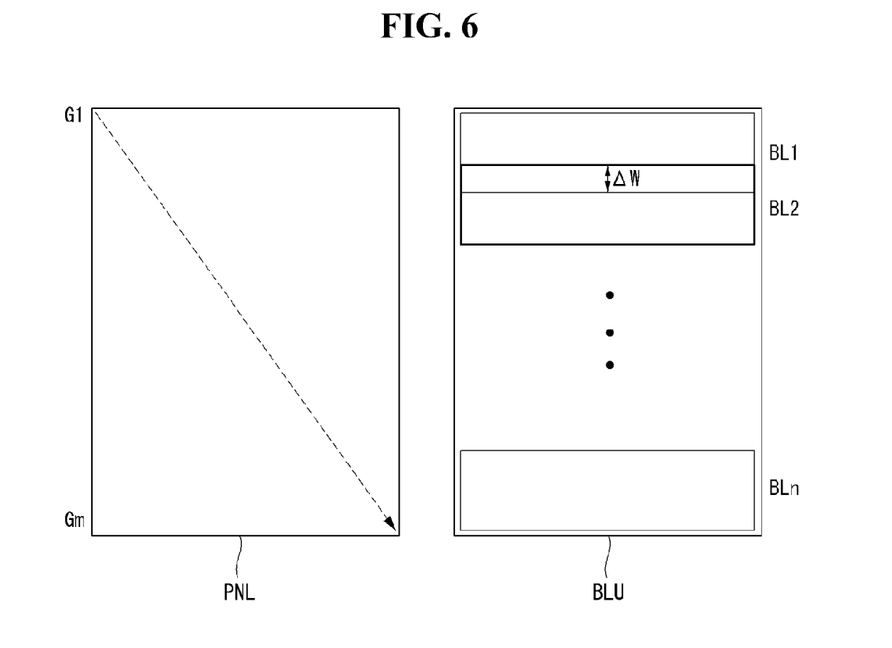

The left- or right-eye images L_IMG or R_IMG output from the control unit 120 are sequentially addressed from the first gate line G1 to the M-th gate line Gm of the liquid crystal panel PNL, as shown in FIGS. 5 and 6, by the driving unit 130. In other words, by sequentially driving the first gate line G1 to the M-th gate line Gm, the driving unit 130 supplies the left- and right-eye images L_IMG and R_IMG output from the control unit 120 to the first data line D1 to the N-th data line Dn as the data driving signals to generate the left- and right-eye images L_IMG and R_IMG on the liquid crystal panel. Here, the time taken for addressing each of the left- and right-eye images L_IMG and R_IMG to the liquid crystal panel PNL may be approximately 8.35 ms. That is, the time taken for sequentially driving the first gate line G1 to the M-th gate line Gm can be approximately 8.35 ms. The backlight unit BLU is scanned for each block and sequentially lighted from the first block BL1 to the N-th block BLN. The backlight unit BLU is scanned for each block to provide light to the liquid crystal panel PNL before the addressing of each of the left-eye and right-eye images L_IMG and R_IMG to the liquid crystal panel PNL is completed. In other words, during the time of sequentially driving the first gate line G1 to the M-th gate line Gm. The lighting period BLU_ON of the backlight unit BLU for displaying the left-eye image L_IMG partially overlaps with the addressing period of the left-eye image L_IMG. The lighting period BLU_ON of the backlight unit BLU for displaying the right-eye image R_IMG partially overlaps with the addressing period of the right-eye image R_IMG. Also, the lighting periods of adjacent blocks of the backlight unit BLU partially overlap each other. The backlight unit BLU is scanned in this manner because the response time LC_rep of liquid crystals included in the liquid crystal panel PNL is taken into account. The left-eye shutter L-SGLS and right-eye shutter R-SGLS of the shutter glasses SGLS are alternately turned on and off depending on whether the left-eye image L_IMG or the right-eye image R_IMG is displayed.

Figure 7:
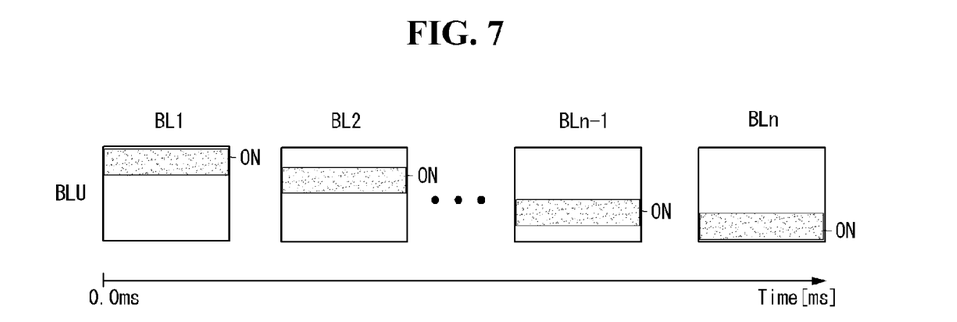

In the first exemplary embodiment, the scan speed scn_s of the backlight unit BLU is made faster than the addressing speed L_add_s or R_add_s of the liquid crystal panel PNL. In other words, the scan period of the backlight unit BLU is made shorter than the addressing period for addressing each of the left-eye and right-eye images L_IMG and R_IMG to the liquid crystal panel PNL to provide a gap time Gp during which the lighting period BLU_ON of the backlight unit BLU of the current frame and the lighting period of the backlight unit BLU of the next frame do not overlap. As shown in FIGS. 5 to 7, the lighting periods $T_{BLU}$ of the blocks of the backlight unit BLU are equal to each other. To make the scan speed scn_s of the backlight unit BLU faster than the addressing speed L_add_s of the liquid crystal panel PNL, the difference ΔT between the start points of lighting of adjacent blocks decreases from the upper blocks to the lower blocks. That is, the overlap width ΔW between the lighting periods of the adjacent blocks becomes wider from the upper blocks to the lower blocks. The gap time Gp of the lighting periods prevents the left- and right-eye images from being displayed, being mixed with each other between the left-eye frame displaying the left-eye image L_IMG and the right-eye frame displaying the right-eye image R_IMG. As in the first exemplary embodiment, the condition for making the scan speed scn_s of the backlight unit BLU faster than the addressing speed L_add_s of the liquid crystal panel PNL and driving the stereoscopic image display device at a frame frequency of 120 Hz is satisfied when the following Equation 1 is satisfied.

[Equation 1]

$$T_{BLU} > T_{frame}/n$$

where $T_{BLU}$ indicates the lighting period during which the light source of each block is lighted, $T_{frame}$ indicates the addressing period required for addressing the left- or right-eye image to the liquid crystal panel PNL, and n indicates the number of blocks of the backlight unit BLU.

In the first exemplary embodiment, it can be seen that the lighting period $T_{BLU}$ of each block included in the backlight unit BLU is equal under the condition shown in Equation 1, and the difference ΔT between the start points of lighting of adjacent blocks decreases from the upper blocks to the lower blocks. Due to this, the time LC_rep assigned to the response of liquid crystals varies with the position of the liquid crystal panel. The time LC_rep assigned to the response of liquid crystals decreases from the upper portion to the lower portion of the liquid crystal panel PNL.

Incidentally, when the conventional stereoscopic image display device is driven at a frame frequency of 120 Hz, the scan speed scn_s of the backlight unit BLU and the addressing speed L_add_s or R_add_s at which an image is written in the liquid crystal panel PNL are set equally. In this case, the conventional stereoscopic image display device experiences the problem of mixing of images of the previous frame and the next frame due to the overlap between the lighting periods of the N-th block BLn and the first block BL1 of the backlight unit BLU in the area where the left-eye image L_IMG and the right-eye image R_IMG alternate. However, when the stereoscopic image display device of the exemplary embodiment is driven at a frame frequency of 120 Hz, the scan speed scn_s of the backlight unit BLU is made faster than the addressing speed L_add_s or R_add_s at which an image is written in the liquid crystal panel PNL, thus providing a gap time Gp caused by a difference Tg between the scan speed and the addressing speed. Accordingly, the stereoscopic image display device of the exemplary embodiment can prevent the problem of mixing of images of the previous frame and the next frame and display a smooth stereoscopic image because the lighting periods of the last block BLn and first block BL1 of the backlight unit BLU do not overlap in the area where the left-eye image L_IMG and the right-eye image R_IMG alternate.

[Second Exemplary Embodiment]

FIGS. 8 to 11 are views for explaining the details of driving a stereoscopic image display device according to a second exemplary embodiment of the present invention.

Figure 8:
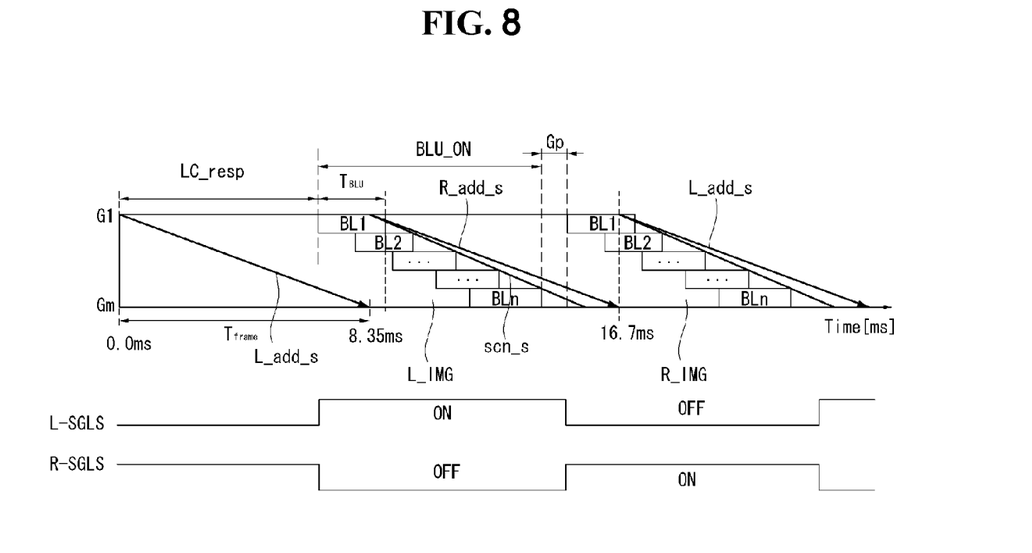
FIGS. 8 to 11 are views for explaining the details of driving a stereoscopic image display device according to a second exemplary embodiment of the present invention.
Figure 9:
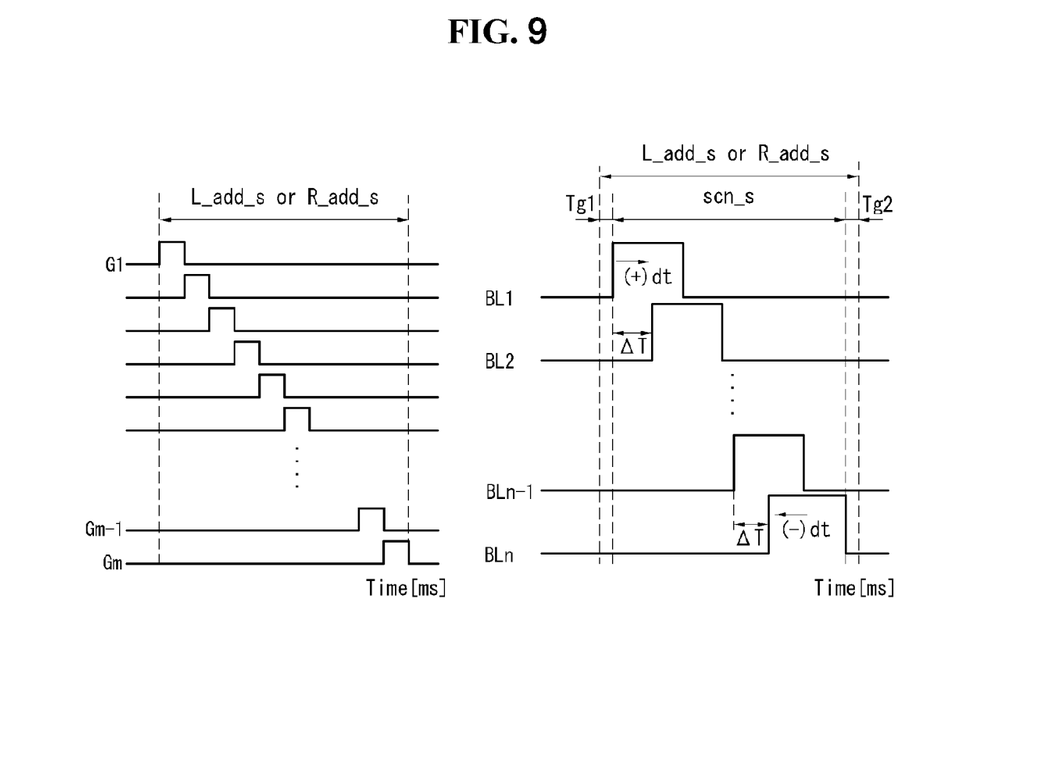
Figure 10:
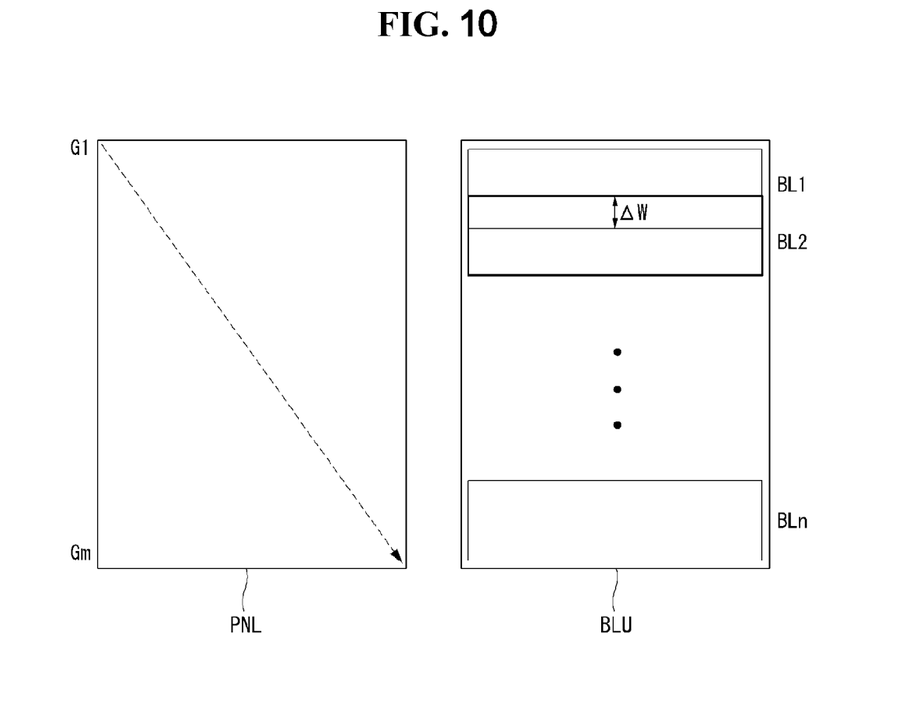
Figure 11:
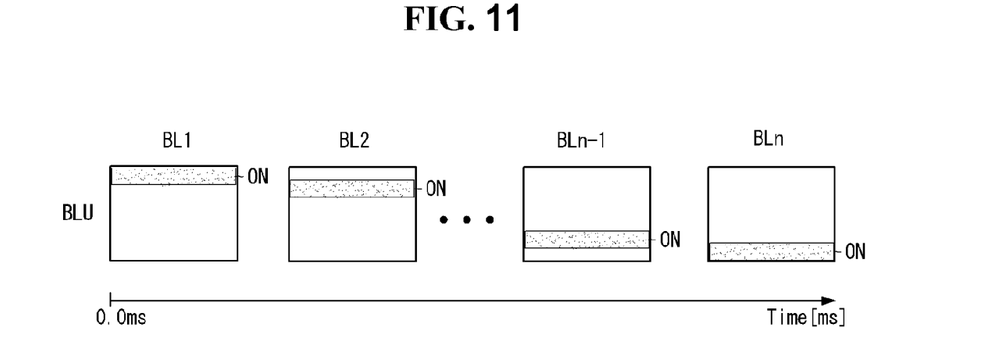

The liquid crystal panel PNL included in the stereoscopic image display device according to the second exemplary embodiment of the present invention alternately displays a left-eye image L_IMG and right-eye image R_IMG of each frame in either a left to right or right to left manner. The backlight unit BLU is scanned for each block and sequentially provides light to the liquid crystal panel PNL. The start points of the ON/OFF of the shutter glasses SGLS are equal to the scan start point of the first block BL1 included in the backlight unit BLU or precedes it. This will be described in more detail below.

The left- or right-eye images L_IMG or R_IMG output from the control unit 120 are sequentially addressed from the first gate line G1 to the M-th gate line Gm of the liquid crystal panel PNL, as shown in FIGS. 13 and 14, by the driving unit 130. Here, the time taken for addressing each of the left- and right-eye images L_IMG and R_IMG to the liquid crystal panel PNL may be approximately 8.35 ms. The backlight unit BLU is scanned for each block and sequentially lighted from the first block BL1 to the N-th block BLN. The backlight unit BLU is scanned for each block to provide light to the liquid crystal panel PNL before the addressing of each of the left-eye and right-eye images L_IMG and R_IMG to the liquid crystal panel PNL is completed. The lighting period BLU_ON of the backlight unit BLU for displaying the left-eye image L_IMG partially overlaps with the addressing period of the left-eye image L_IMG. The lighting period BLU_ON of the backlight unit BLU for displaying the right-eye image R_IMG partially overlaps with the addressing period of the right-eye image R_IMG. Also, the lighting periods of adjacent blocks of the backlight unit BLU partially overlap each other. The backlight unit BLU is scanned in this manner because the response time LC_rep of liquid crystals included in the liquid crystal panel PNL is taken into account. The left-eye shutter L-SGLS and left-eye shutter R-SGLS. of the shutter glasses SGLS are alternately turned ON/OFF depending on whether the left-eye image L_IMG or the right-eye image R_IMG is displayed.

In the second exemplary embodiment, the scan speed scn_s of the backlight unit BLU is made faster than the addressing speed L_add_s or R_add_s of the liquid crystal panel PNL. In other words, the scan period scn_s of the backlight unit BLU is made shorter than the addressing period for addressing each of the left-eye and right-eye images L_IMG and R_IMG to the liquid crystal panel PNL to provide a gap time Gp during which the lighting period BLU_ON of the backlight unit BLU of the current frame and the lighting period of the backlight unit BLU of the next frame do not overlap. As shown in FIGS. 13 to 15, the lighting periods TBLU of the blocks of the backlight unit BLU are equal to each other. To make the scan speed scn_s of the backlight unit BLU faster than the addressing speed L_add_s or R_add_s of the liquid crystal panel PNL, the difference ΔT between the start points of lighting of the uppermost adjacent blocks and the difference ΔT between the start points of lighting of the lowermost adjacent blocks are set to be smaller than the difference between the start points of lighting of the remaining adjacent blocks. That is, the overlap width ΔW of the lighting periods of the adjacent blocks becomes further wider at the two uppermost blocks and the two lowermost blocks, rather than at the remaining blocks. To this end, the start point of lighting of the first block BL1 is delayed (+)dt, and the start point of lighting of the last block BLn is advanced (−)dt. A lighting period gap time Gp may vary according to (+)dt and (−)dt. The lighting period gap time Gp prevents the left- and right-eye images from being displayed, being mixed between the left-eye frame displaying the left-eye image L_IMG and the right-eye frame displaying the right-eye image R_IMG.

As described above, the stereoscopic image display device according to the present invention can display a smooth stereoscopic image by preventing mixing of images displayed between frames at the lowest image frequency of 120 Hz at which flicker perception can be eliminated by adjusting the lighting period of the backlight unit. Moreover, the present invention can reduce heat generation, electromagnetic wave interference, and power consumption of the driving circuit because the device is driven at the lowest image frequency of 120 Hz.

While the exemplary embodiment has been described in detail with reference to the drawings, it will be understood by those skilled in the art that the invention can be implemented in other specific forms without changing the technical spirit or essential features of the invention. Therefore, the scope of the invention is defined by the appended claims rather than the detailed description of the invention. All changes or modifications or their equivalents made within the meanings and scope of the claims should be construed as falling within the scope of the invention.

What is claimed is:

1. A stereoscopic image display device, comprising:
    a liquid crystal panel having a plurality of gate lines and a plurality of data lines for time-divisionally displaying left-eye image frame data and right-eye image frame data;
    a backlight unit being divided into a plurality of blocks, and sequentially scanned for each block to provide light to the liquid crystal panel; and
    shutter glasses comprising a left-eye filter transmitting only the light of the left-eye image and a right-eye filter transmitting only the light of the right-eye image,
    wherein the time period of sequentially lighting the first to the last blocks of the backlight unit is shorter than the period of addressing the left-eye image frame data or the right-eye image frame data from the first line to the last line of the liquid crystal panel.

2. The stereoscopic image display device of claim 1, wherein the lighting period of the backlight unit for displaying the left-eye image partially overlaps with the addressing period of the left-eye image frame data, and the lighting period of the backlight unit for displaying the right-eye image partially overlaps with the addressing period of the right-eye image frame data.

3. The stereoscopic image display device of claim 1, wherein, in the backlight unit, the lighting periods of adjacent blocks partially overlap each other.

4. The stereoscopic image display device of claim 1, wherein the lighting period of each block of the backlight unit is equal; and
    an overlap width of the lighting periods of the adjacent blocks becomes wider from the upper blocks to the lower blocks.

5. The stereoscopic image display device of claim 4, wherein the difference between the start points of lighting of the adjacent blocks decreases from the upper blocks to the lower blocks.

6. The stereoscopic image display device of claim 1, wherein the lighting period of each block of the backlight unit is equal; and
    the overlap width of the lighting periods of the adjacent blocks becomes further wider at the two uppermost blocks and the two lowermost blocks, rather than at the remaining blocks.

7. The stereoscopic image display device of claim 6, wherein the difference between the start points of lighting of the uppermost adjacent blocks and the difference between the start points of lighting of the lowermost adjacent blocks are less than the difference between the start points of lighting of the remaining adjacent blocks.

8. The stereoscopic image display device of claim 1, wherein the start point of lighting of the first block is delayed a predetermined time, and the start point of lighting of the last block is advanced a predetermined time.

9. The stereoscopic image display device of claim 1, wherein the left-eye image frame data and the right-eye image frame data are time-divided at 120 Hz; and the lighting period TBLU of each block satisfies the following equation:

$$T_{LC}+T_{BLU} \leq T_{frame}$$

wherein Tframe indicates the addressing period required for addressing the left-eye image frame data or the right-eye image frame data to the liquid crystal panel, and n indicates the number of blocks of the backlight unit.

10. A stereoscopic image display device, comprising:
a liquid crystal panel having a plurality of gate lines and a plurality of data lines for time-divisionally displaying left-eye image frame data and right-eye image frame data;
a backlight unit being divided into a plurality of blocks, and sequentially scanned for each block to emit light to the liquid crystal panel; and
shutter glasses comprising a left-eye filter transmitting only the light of the left-eye image and a right-eye filter transmitting only the light of the right-eye image,
wherein the scanning periods for adjacent blocks partially overlap each other to make the time period of scanning all blocks of the backlight unit be shorter than the time period of sequentially driving the first gate line to the last gate line of the liquid crystal panel.

11. The stereoscopic image display device of claim 10, wherein the time period of sequentially scanning the first block to the last block of the backlight unit partially overlaps with the time period of sequentially driving the first gate line to the last gate line of the liquid crystal panel.

12. The stereoscopic image display device of claim 10, wherein the scanning periods of the blocks of the backlight unit are equal; and an overlap width of the scanning periods of the adjacent blocks gradually increase from the upper blocks to the lower blocks.

13. The stereoscopic image display device of claim 10, wherein the scanning periods of the blocks of the backlight unit are equal; and the overlap width of the scanning periods of the two uppermost adjacent blocks and the two lowermost adjacent blocks is greater than that of the scanning periods of the other adjacent blocks.

14. The stereoscopic image display device of claim 10, wherein the start point of scanning of the first block is delayed a predetermined time, and the start point of scanning of the last block is advanced a predetermined time.

15. The stereoscopic image display device of claim 10, wherein the left-eye image frame data and the right-eye image frame data are time-divided at 120 Hz; and the following equation is satisfied:

$$T_{BLU} > T_{frame}/n$$

where $T_{BLU}$ indicates the scanning period of each block, $T_{frame}$ indicates the time period of sequentially driving the first gate line to the last gate line of the liquid crystal panel, and n indicates the number of blocks of the backlight unit.

* * * * *